United States Patent [19]
Maute et al.

[11] Patent Number: 5,325,832
[45] Date of Patent: Jul. 5, 1994

[54] POWER-CONTROLLING METHOD FOR CONTROLLING MIXTURE-COMPRESSING INTERNAL COMBUSTION ENGINE

[75] Inventors: Kurt Maute, Sindelfingen; Wolfgang Strauss, Denkendorf; Andreas Weber, Lorch, all of Fed. Rep. of Germany

[73] Assignee: Mercedes-Benz AG, Fed. Rep. of Germany

[21] Appl. No.: 42,554

[22] Filed: Apr. 5, 1993

[30] Foreign Application Priority Data

Apr. 30, 1992 [DE] Fed. Rep. of Germany ....... 4214179

[51] Int. Cl.$^5$ .............................................. F02D 11/10
[52] U.S. Cl. ................................. 123/396; 123/397; 123/399
[58] Field of Search ................ 123/198 DB, 198 DC, 123/396, 397, 399, 479, 481, 630, 198 F

[56] References Cited

U.S. PATENT DOCUMENTS

| | | | |
|---|---|---|---|
| 4,491,112 | 1/1985 | Kanegae et al. | 123/397 X |
| 4,574,752 | 3/1986 | Reichert, Jr. et al. | 123/397 X |
| 4,779,597 | 10/1988 | Takaku et al. | 123/479 |
| 4,854,283 | 8/1989 | Kiyono et al. | 123/399 X |
| 4,947,815 | 8/1990 | Peter | 123/399 |
| 5,092,298 | 3/1992 | Suzuki et al. | 123/399 X |
| 5,121,727 | 6/1992 | Kramer et al. | 123/399 |
| 5,150,679 | 9/1992 | Peter | 123/397 |
| 5,150,680 | 9/1992 | Nishimura | 123/399 |

FOREIGN PATENT DOCUMENTS

| | | |
|---|---|---|
| 3129078 | 2/1988 | Fed. Rep. of Germany . |
| 3631283 | 3/1988 | Fed. Rep. of Germany . |
| 40745 | 3/1985 | Japan ...................................... 123/399 |
| 2252641 | 8/1992 | United Kingdom . |
| WO90/08251 | 7/1990 | World Int. Prop. O. . |

*Primary Examiner*—Willis R. Wolfe
*Attorney, Agent, or Firm*—Evenson, McKeown, Edwards & Lenahan

[57] ABSTRACT

A method and apparatus control the power to be delivered by a mixture-compressing internal combustion engine which, during normal operation of the internal combustion engine, is adjusted by matching the fuel injection quantity to the induced air mass flow corresponding to the current load demand and controllable by a setting element. So that control of the internal combustion engine power to be delivered remains possible (emergency driving function) in the case of an impairment of the function of the setting element for controlling the induced air mass flow but, at the same time, so that a reduction in the volumetric efficiency of the internal combustion engine is not to be expected in normal operation, the internal combustion engine power is adjusted to the value corresponding to the current load demand during the period of the functional fault exclusively by interventions in the mixture composition and/or by interventions in the ignition and/or by controlled interruption of the fuel delivery to at least one cylinder (i.e. cylinder shut-down).

12 Claims, 2 Drawing Sheets

POWER-CONTROLLING METHOD FOR CONTROLLING MIXTURE-COMPRESSING INTERNAL COMBUSTION ENGINE

BACKGROUND AND SUMMARY OF THE INVENTION

The present invention relates to a method and apparatus for controlling the power to be delivered by a mixture-compressing internal combustion engine and, more particularly, to a method and apparatus in which power is adjusted by a setting element during normal operation of the engine by matching fuel injection quantity to induced air mass flow corresponding to a current load demand and the setting element is held in a constant opening position in the event of a functional fault thereof.

U.S. Pat. No. 4,779,597 discloses a method which provides for the throttle butterfly to be no longer actuated when it is found that there is an impairment of the function of this throttle butterfly and for the induced air flow to be guided via a by-pass conduit bypassing the throttle butterfly. The magnitude of the induced air mass flow passing this by-pass conduit, and therefore also the power of the internal combustion engine, being controlled by a valve device arranged in the by-pass conduit. It is, in turn, possible to trigger this valve device by way of an electronic control unit as a function, among other things, of a load demand signal (accelerator pedal position). This known method has the disadvantage that a separate by-pass conduit is required and that eddying of the induced air occurs where it branches from and opens into the induction conduit when no functional impairment of the main throttle butterfly is present. This eddying leads to a reduction in the volumetric efficiency which is of particular disadvantage at full load, i.e. with the main throttle butterfly open to the maximum extent, because it is precisely in this operating condition that a maximum volumetric efficiency is the precondition for a maximum power of the internal combustion engine. In addition, the components necessary for carrying out the known method (by-pass conduit, additional valve element and additional actuator) take up a relatively large installation space.

An object of the present invention is to provide a method such that, in the case of an impairment of the function of the setting element for controlling the induced air mass flow, control of the internal combustion engine power to be delivered still remains possible (emergency driving function) but, at the same time, no reduction in the volumetric efficiency of the internal combustion engine is to be expected in normal operation.

The foregoing object has been achieved in accordance with the invention by a method and apparatus in which, during existence of the functional fault, internal combustion engine power is adjusted to a value corresponding to the current load demand ($\beta$) exclusively by one or more of interventions in mixture composition, interventions in ignition timing, and controlled interruption of the fuel delivery to at least one cylinder so as to provide cylinder shut-down.

With the method and apparatus according to the present invention, an additional by-pass conduit is unnecessary because the power to be delivered by the internal combustion engine is controlled exclusively by interventions in the mixture composition and/or by interventions in the ignition and/or by specific cylinder shut-down when there is an impairment of the function of the setting element controlling the induced air mass flow. Consequently, no eddying of the induced air flow can occur at the positions where such a by-pass conduit branches from the induction conduit or at the positions where it opens into the induction conduit so that, in normal operation of the internal combustion engine, a maximum volumetric efficiency is ensured, particularly at full load, i.e. with the induction conduit freed to its maximum extent. Furthermore, no additional installation space is demanded by a by-pass conduit and by a valve device, with associated actuator, controlling its cross-section.

If, according to the present invention, the setting element is driven by spring force into a specified opening position in the case of a functional fault, emergency driving operation is then also possible if the functional fault occurs at a time when the setting element happens to be in the closed position such as during idling of the internal combustion engine. In this situation, a larger air mass flow than the air mass flow provided in normal operation when idling is specified is again induced because the throttle butterfly is necessarily driven into a specified opening position so that, due to the measures according to the invention, control of the power to be delivered by the internal combustion engine remains possible over a wide range.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
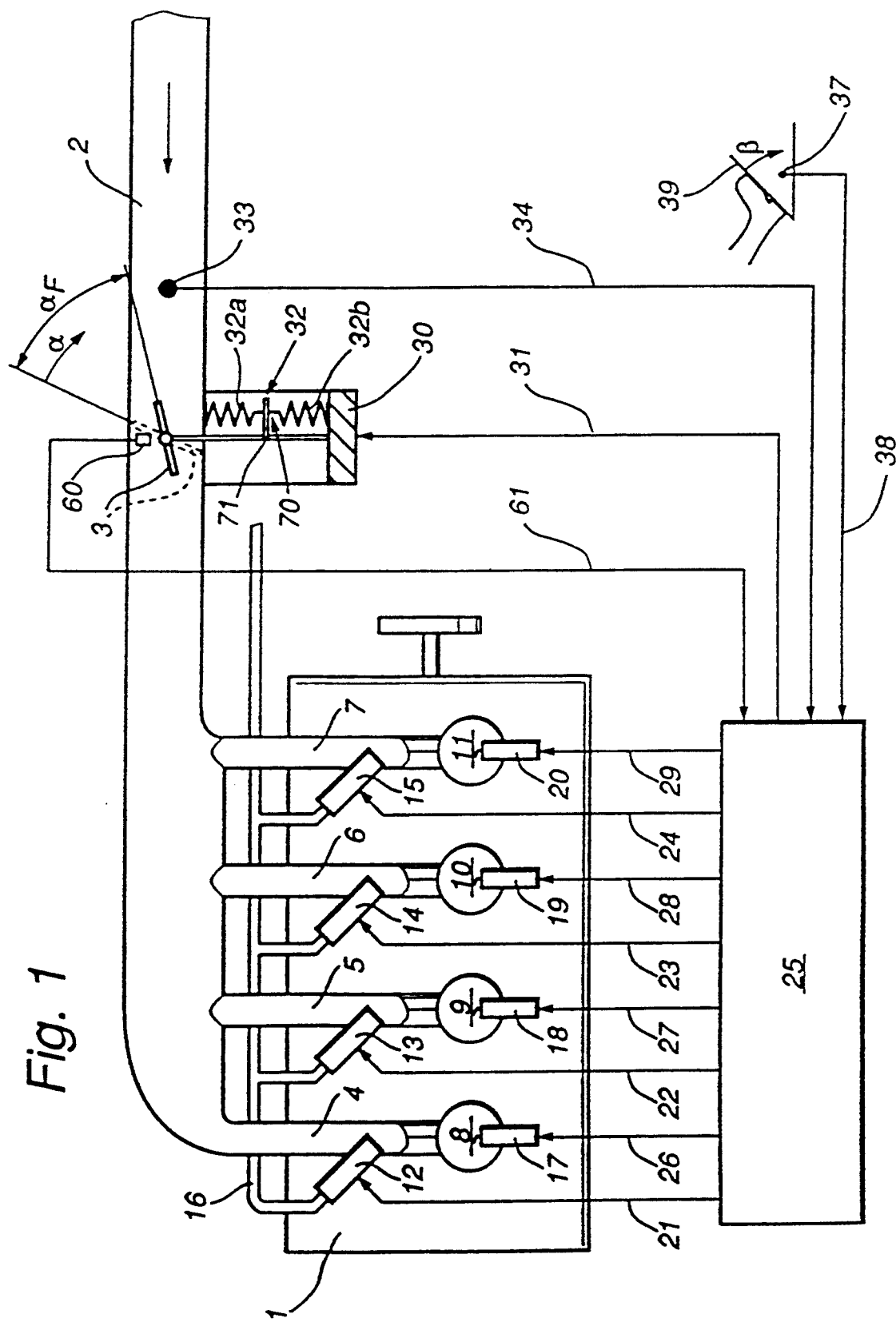
FIG. 1 is a schematic view of an apparatus utilizing an electronic control unit for carrying out the method according to the present invention.

In FIG. 1, a four-cylinder mixture-compressing internal combustion engine designated generally by the numeral 1, has an induction conduit 2 is arranged a throttle butterfly 3 through which the air flow induced by the internal combustion engine can be controlled. The induction conduit 2 merges into four individual induction pipes 4, 5, 6 and 7 which respectively open into the combustion spaces of the individual cylinders 8, 9, 10 and 11 of the internal combustion engine 1.

A respective magnetic valve 12, 13, 14 and 15 protrudes into each of these individual induction pipes 4, 5, 6 and 7 for injecting a fuel quantity corresponding to the currently induced air mass flow $m_L$, i.e. to a power to be currently delivered by the internal combustion engine. The fuel injection valves 12, 13, 14 and 15 are all connected to a fuel supply conduit 16.

The ignition of the fuel/air mixture compressed in the combustion spaces of the respective individual cylinders 8, 9, 10 and 11 takes place via spark plugs 17, 18, 19 and 20. The fuel injection valves 12, 13, 14 and 15 are triggered or pulsed independently of one another via respective control conductors 21, 22, 23, and 24 from an electronic control unit 25. The four spark plugs 17, 18, 19 and 20 are likewise triggered by the electronic control unit 25 via the respective control conductors 26, 27, 28 and 29.

The drive of the throttle butterfly 3 takes place via an actuator configured as an electric motor 30 which can be triggered via the control conductor 31 by the electronic control unit 25. The electric motor 30 acts against a setting spring device 32 which, when the electric motor 30 is not activated, drives the throttle butterfly 3 into a specified opening position $\alpha_F$ and holds or maintains it in this opening position. The setting spring device 32 consists of two partial springs 32a, 32b connected together. A linkage 71 for the actuation of the throttle butterfly 3 is fastened at the connecting position 70. The setting device 32 is then configured such that, when the forces of the two partial springs 32a, 32b precisely cancel each other (unloaded condition), the throttle butterfly 3 is located in the specified opening position, $\alpha_F$. In a further embodiment of the present invention, it is also possible to support one of the two partial springs 32a or 32b against an adjustable stop by way of which the specified opening position, $\alpha_F$, can be arbitrarily changed or a fine adjustment carried out.

The broken line representation of the throttle butterfly 3 in FIG. 1 shows the latter in its closed position, i.e. in its position reducing the flow cross-section to a minimum (idling position). The solid-line representation of the throttle butterfly 3 shows the position which the throttle butterfly 3 takes up with the setting spring device 32 unloaded (deflection $\alpha_F$) when the electric motor 30 is not activated or triggered by the control unit 25.

An air mass flow meter 33 is located upstream of the throttle butterfly 3 in the induction conduit 2 and a signal corresponding to the currently induced air mass flow, $m_L$, is transmitted from this meter 33 to the electronic control unit 25 via the measurement conductor 34. A signal corresponding to the current load demand (deflection $\beta$ of the accelerator pedal 39 actuated by the driver) is also supplied to the electronic control unit 25 by the sensor 37 and the measurement conductor 38. A signal corresponding to the current position, $\alpha$, of the throttle butterfly 3 is supplied to the electronic control unit 25 by the sensor 60 and the measurement conductor 61.

During the normal operation of the internal combustion engine 1, i.e. when there is no malfunction of the throttle butterfly 3 due, for example, to a defective electric motor 30, the current value for the fuel injection quantity (fuel mass flow $m_K$) corresponding to the current operating point of the internal combustion engine is continuously found from a characteristic diagram deposited in a fixed value memory of the electronic control unit 25. The individual injection valves 12, 13, 14, and 15 are pulsed via the respective control conductors 21, 22, 23 and 24 to correspond with this fuel mass flow, $m_X$, which has been found. The ignition timing is likewise found for each individual cylinder 8, 9, 10 and 11 as a function of the current operating point of the internal combustion engine 1, and the individual spark plugs 17, 18, 19 and 20 are triggered accordingly. The actuation of the throttle butterfly 3 as a function of the load demand takes place, in this case, by the electric motor 30, which is triggered by the electronic control unit 25. The electric motor 30 acts against the force of the setting spring device 32 (resulting from the two partial spring forces) as previously described.

If it is now found that there is an impairment to the function (or malfunction) of the throttle butterfly 3 due, for example, to a defective electric motor 30, the latter is deactivated by the electronic control unit 25. That is, the electric motor 30 is also, inter alia, decoupled mechanically from the throttle butterfly 3, so that, as a result of the equilibrium of the forces which becomes established at the setting spring device 32, the throttle butterfly 3 is driven into the specified opening position, $\alpha_F$, (i.e. the solid-line position of the throttle butterfly 3).

As long as the electric motor 30 is deactivated, therefore, the throttle butterfly 3 is held in the specified opening position, $\alpha_F$. The control of the internal combustion engine power in this phase then takes place exclusively by appropriate matching of the mixture composition, $\lambda$, and by appropriate matching of the ignition timing ZZP and specific switching on or off of the fuel delivery to the cylinder 8 (cylinder shut-down). When, on one hand, a reduction in power is desired (reduction of the load demand $\beta$), the mixture is weakened, the ignition timing is displaced in the "retarded" direction and the frequency with which the cylinder 8 is shut down in a specified time interval, i.e. the fuel allocation for this cylinder 8 is interrupted, is increased. If, on the other hand, an increase in power is required (increase in the load demand $\beta$), the mixture is enriched, the ignition timing is displaced in the "advanced" direction and the frequency with which the cylinder 8 is shut down in a specified time interval, i.e. the fuel allocation for this cylinder 8 is interrupted, is again reduced. By way of the method according to the present invention, therefore, a relatively comfortable emergency driving operation is still always possible despite a failure of the actual power control element of the internal combustion engine.

When the impairment of the function of the throttle butterfly 3 is no longer present, the control in the conventional manner of the internal combustion engine power to be delivered is resumed and specifically by way of a continual matching of the fuel injection quantity for the respective throttle butterfly position corresponding to the current operating point.

If the throttle butterfly 3 has jammed, i.e. if the throttle butterfly 3 cannot be driven into the specified opening position, $\alpha_F$, by the setting spring device 32 after the functional impairment has been recognized, the internal combustion engine power to be delivered is controlled, as also in the previously described case of a defective electric motor 30, by specific interventions in the mixture composition, $\lambda$, by the ignition and by a controlled cylinder shut-down, account of course being taken of the opening position, $\alpha$, in which the throttle butterfly 3 has jammed.

Figure 2:
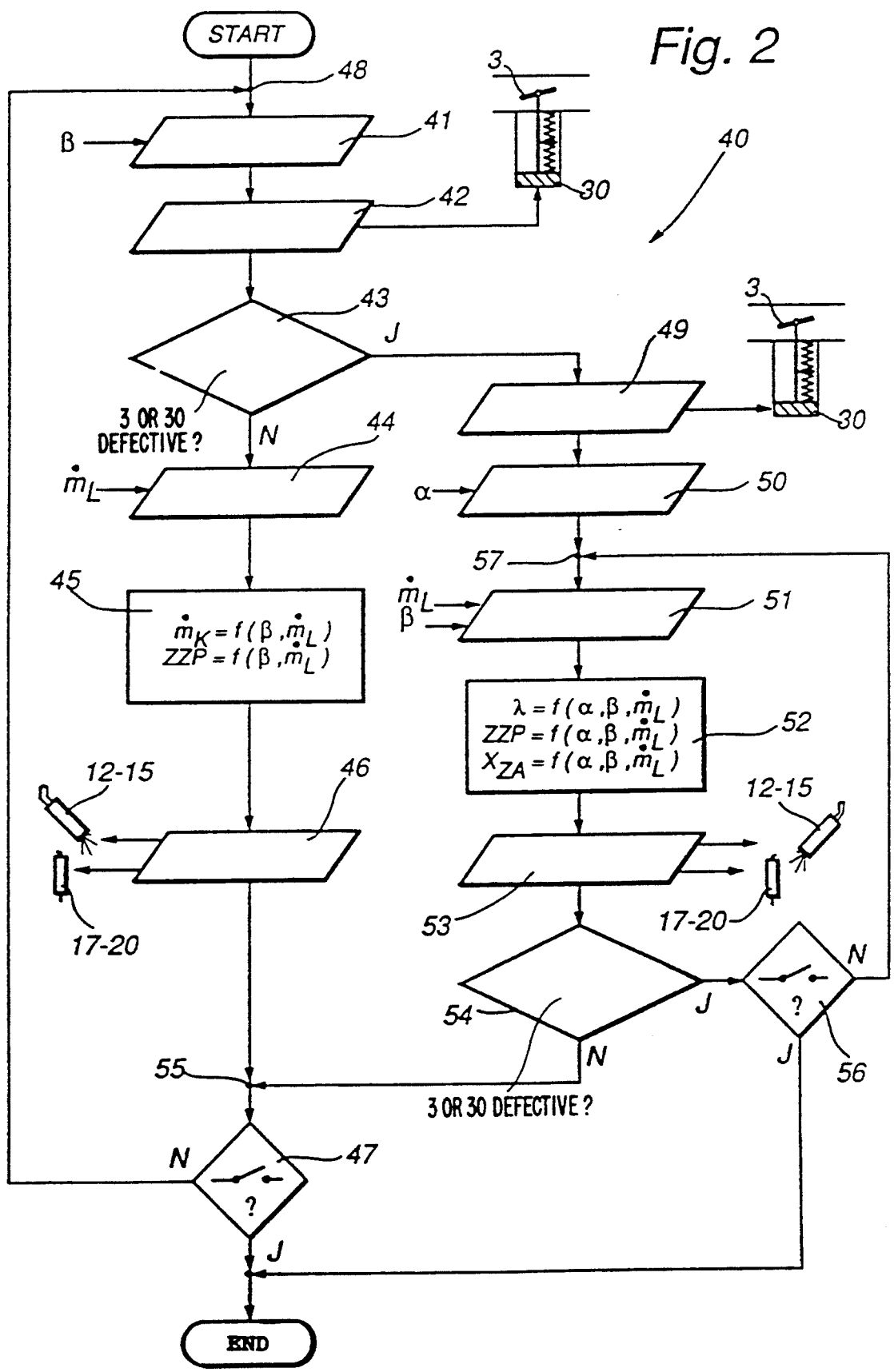
FIG. 2 is a flow diagram showing the mode of operation of the electronic control unit in FIG. 1.

The mode of operation of the electronic control unit 25 is explained in more detail in FIG. 2 through a flow diagram 40.

After the internal combustion engine 1 has started, the current or instantaneous value for the load demand, $\beta$, is input in the input block 41. By way of the following output block 42, the throttle butterfly 3 is brought into the associated opening position, $\alpha$, as a function of this load demand parameter, $\beta$, by correspondingly triggering the electric motor 30. The following branch block 43 then checks whether there is an impairment of the function of the throttle butterfly 3 or of the electric motor 30. This takes place in such a way that after a change to the load demand, $\beta$, by the electronic control unit 25, the associated change in the throttle butterfly deflection is found and, after a specified interval has elapsed, the control unit checks whether the position of the throttle butterfly 3 has also actually changed to the corresponding extent. If this is the case, there is no fault of any type present in the actuation of the throttle butterfly 3 and branching therefore takes place to the input block 44 in which the currently induced air mass flow $m_L$ recorded by the sensor 33 is input. In the following operational block 45, finally, the fuel mass flow $m_K$ for each injection valve 12, 13, 14 and 15 associated with the current operating point (determined by $\beta$ and $m_L$) is found in a known manner from a characteristic diagram. The ignition timing ZZP corresponding to this operating point is likewise read out from an ignition characteristic diagram. The injection valves 12, 13, 14 and 15 and the spark plugs 17, 18, 19 and 20 are triggered corresponding to the required values found in the block 45 by the following output block 46. If inspection in the branch block 47 shows that the ignition has not yet been switched off by the driver, the control branches back to the point 48 for renewed input of the current value of $\beta$, otherwise the control branches to the end.

If the interrogation in the branch block 43 shows that there is an impairment of the function of the throttle butterfly 3 due, for example, to a defective electric motor 30 or a Jammed throttle butterfly 3, the control branches to the output block 49, by way of which the electric motor 30 is deactivated. This deactivation of the electric motor 30 leads to a mechanical decoupling of the throttle butterfly 3 from its drive so that, if the functional fault is caused exclusively by a defective electric motor 30, the throttle butterfly 3 is freely movable so that it can be driven by the setting spring device 32 into the defined opening position $\alpha_F$, and be held there. If the functional fault should be caused by jamming of the throttle butterfly 3 itself, the electric motor 30 is still mechanically decoupled from the throttle butterfly 3 by its deactivation but even so, the question of whether the throttle butterfly 3 can be brought into the specified opening position, $\alpha_F$, by the setting spring device 32 depends on whether the spring force is greater than the force with which the throttle butterfly 3 is held in the Jammed position. So that the actual opening position, $\alpha$, of the throttle butterfly 3 can be taken into account, even in this case, the current opening position, $\alpha$, of the throttle butterfly 3, recorded by the sensor 60, is input in the following input block 50. Furthermore, the current air mass flow, $m_L$, and the current load demand, $\beta$, are also input in the following input block 51. In a manner according to the invention, the required values are found, as a function of these input parameters $\alpha$, $m_L$ and $\beta$, in the following block 52 for a mixture composition, $\lambda$, corresponding to the power to be delivered, for an ignition timing ZZP corresponding to the power to be delivered and for a number $X_{ZA}$ of shut-downs of the cylinder 8 per time interval corresponding to the power to be delivered. The injection valves 12, 13, 14 and 15 and the spark plugs 17, 18, 19 and 20 are then triggered to suit these required values found by the following output block 53. The cylinder shut-down is achieved such that the respective fuel allocation for the cylinder 8 to be shut down is interrupted.

The following branch block 54 checks whether there is still a fault in the actuation of the throttle butterfly 3. If not, i.e. if an only temporarily jammed throttle butterfly 3 has released itself again, for example, the control branches to the point 55 for the interrogation of whether the ignition has already been switched off or not. If the functional fault in the actuation of the throttle butterfly 3 is still present (block 54), the control branches (if it is found in the branch block 56 that the ignition has not yet been switched off by the driver in the meantime) to the point 57 for renewed input of the values for $m_L$ and $\beta$ describing the current power to be delivered by the internal combustion engine 1.

It is not absolutely necessary for the control of the power to be delivered by the internal combustion engine in the case of a fault in the throttle butterfly actuation to take place Jointly by all three measures (intervention in the mixture composition $\lambda$, intervention in the ignition and cylinder shut-down); it can also take place via only two of these measures or by only one of these measures individually. The employment of all three measures gives the advantage that the control of the power to be delivered by the internal combustion engine can take place over a relatively wide range. Furthermore, cylinder shut-down does not necessarily have to take place on one cylinder only, as in the above embodiment example. I t is also possible for several cylinders to be switched off simultaneously, i.e. to be separated from the fuel supply.

Furthermore, it is not absolutely necessary for the throttle butterfly to be mechanically decoupled from the electric motor in the case of an impairment of the function of the throttle butterfly if the setting spring device is configured such that its force or torque is sufficient to bring the throttle butterfly into the specified opening position $\alpha_F$ (emergency driving position) in the case where the electric motor, although deactivated, is still mechanically coupled to the throttle butterfly.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus, for controlling delivered power form a mixture-compressing internal combustion engine, comprising an electronic control unit, a butterfly valve, an electric motor operatively connected with the butterfly valve and configured to be triggered by the electronic control unit for actuating a throttle butterfly into a desired position, and a setting spring device arranged to act against the electric motor wherein, during normal operation of the engine, the butterfly valve controls induced mass flow corresponding to current load demand and a fuel injection quantity is matched to the induced mass flow and during deactivated periods of the electric motor, the throttle butterfly is mechanically decoupled therefrom and is held by the setting spring device in a specified opening position, wherein, during the deactivation of the electric motor, with decreasing load demand at least one of the following occurs: the mixture composition is altered in a lean direction, the ignition timing is displaced in a retarded direction, and a frequency of the cylinder shut-downs is increased.

2. An apparatus for controlling delivered power from a mixture-compressing internal combustion engine, comprising an electronic control unit, a butterfly valve, an electric motor operatively connected with the butterfly valve and configured to be triggered by the electronic control unit for actuating a throttle butterfly into a desired position, and a setting spring device arranged to act against the electric motor wherein, during normal operation of the engine, the butterfly valve controls induced mass flow corresponding to current load demand and a fuel injection quantity is matched to the induced mass flow and during deactivated periods of the electric motor, the throttle butterfly is mechanically decoupled therefrom and is held by the setting spring device in a specified opening position, wherein, during the deactivation of the electric motor, with increasing load demand, at least one of the following occurs: the mixture composition is altered in a rich direction, the ignition timing is displaced in an advanced direction, and a frequency of the cylinder shut-downs is reduced and vice versa.

3. The apparatus according to claim 2, wherein, after recognition of the deactivation of the electric motor, a current position of the butterfly valve is determined and, as functions of the current position of the butterfly valve, of the current load demand, and of the currently induced air mass flow, electronic control unit is configured to find from a preexisting characteristic diagram associated required values for the mixture composition, for the ignition timing and for the frequency of the cylinder shut-downs.

4. The method according to claim 2, wherein, in the event of deactivation of the electric motor, butterfly valve is driven by spring force into a specified opening position.

5. A method for controlling delivered power from a mixture-compressing internal combustion engine, comprising the steps of adjusting power by a setting element during normal operation of the engine by matching fuel injection quantity to induced air mass flow corresponding to a current load demand and controllable by a setting element, holding the setting element in a constant opening position in the case of a functional fault thereof, and, during existence of the functional fault, adjusting internal combustion engine power to a value corresponding to the current load demand exclusively by one or more of interventions in mixture composition, interventions in ignition timing, and controlled interruption of the fuel delivery to at least one cylinder so as to provide cylinder shut-down, wherein, during the existence of the functional fault, with increasing load demand at least one of the following occurs: the mixture composition is altered in a rich direction, the ignition timing is displaced in an advanced direction, and a frequency of the cylinder shut-downs is reduced and vice versa.

6. The method according to claim 5, wherein, after recognition of the functional fault, a current position of the setting element is found and, as functions of the current position of the setting element, of the current load demand, and of the currently induced air mass flow, associated required values for the mixture composition, for the ignition timing and for the frequency of the cylinder shut-downs are found from a preexisting characteristic diagram.

7. The method according to claim 5, wherein, during the existence of the functional fault, with increasing load demand, the mixture composition is altered in a rich direction and/or the ignition timing is displaced in an advanced direction and/or a frequency of the cylinder shut-downs is reduced and vice versa.

8. The method according to claim 5, wherein, after recognition of the functional fault, a current position of the setting element is found and, as functions of the current position of the setting element, of the current load demand, and of the currently induced air mass flow, associated required values for the mixture composition, for the ignition timing and for the frequency of the cylinder shut-downs are found from a preexisting characteristic diagram.

9. A method for controlling delivered power from a mixture-compressing internal combustion engine, comprising the steps of adjusting power by a setting element during normal operation of the engine by matching fuel injection quantity to induced air mass flow corresponding to a current load demand and controllable by a setting element, holding the setting element in a constant opening position in the case of a functional fault thereof, and, during existence of the functional fault, adjusting internal combustion engine power to a value corresponding to the current load demand exclusively by one or more of inventions in mixture composition, interventions in ignition timing, and controlled interruption of the fuel delivery to at least one cylinder so as to provide cylinder shut-down, wherein, during the existence of the functional fault, with decreasing load demand at least one of the following occurs: the mixture composition is altered in a lean direction, the ignition timing is displaced in a retarded direction, and a frequency of the cylinder shut-downs is increased.

10. The method according to claim 9, wherein, after recognition of the functional fault, a current position of the setting element is found and, as functions of the current position of the setting element, of the current load demand, and of the currently induced air mass flow, associated required values for the mixture composition, for the ignition timing and for the frequency of the cylinder shut-downs are found from a preexisting characteristic diagram 11. The method according to claim 9, wherein, in the event of the functional fault, the setting element is driven by spring force into a specified opening position.

12. The method according to claim 9, wherein, after recognition of the functional fault, a current position of the setting element is found and, as functions of the current position of the setting element, of the current load demand, and of the currently induced air mass flow, associated required values for the mixture composition, for the ignition timing and for the frequency of the cylinder shut-downs are found from a preexisting characteristic diagram.

* * * * *